(12) United States Patent
Pandarinath et al.

(10) Patent No.: US 12,299,582 B2
(45) Date of Patent: May 13, 2025

(54) SYSTEMS AND METHODS FOR TRAINING AN AUTOENCODER NEURAL NETWORK USING SPARSE DATA

(71) Applicant: Emory University, Atlanta, GA (US)

(72) Inventors: Chethan Pandarinath, Decatur, GA (US); Mohammadreza Keshtkaran, Atlanta, GA (US)

(73) Assignee: Emory University, Atlanta, GA (US)

( * ) Notice: Subject to any disclaimer, the term of this patent is extended or adjusted under 35 U.S.C. 154(b) by 1029 days.

(21) Appl. No.: 17/291,975

(22) PCT Filed: Nov. 6, 2019

(86) PCT No.: PCT/US2019/060090
§ 371 (c)(1),
(2) Date: May 6, 2021

(87) PCT Pub. No.: WO2020/097217
PCT Pub. Date: May 14, 2020

(65) Prior Publication Data
US 2021/0406695 A1    Dec. 30, 2021

Related U.S. Application Data

(60) Provisional application No. 62/756,215, filed on Nov. 6, 2018, provisional application No. 62/886,628, filed on Aug. 14, 2019.

(51) Int. Cl.
*G06N 20/00* (2019.01)
*G06N 3/045* (2023.01)
(Continued)

(52) U.S. Cl.
CPC ............. *G06N 3/088* (2013.01); *G06N 3/045* (2023.01); *G06N 3/084* (2013.01); *G06N 20/00* (2019.01);
(Continued)

(58) Field of Classification Search
None
See application file for complete search history.

(56) References Cited

U.S. PATENT DOCUMENTS

2003/0055799 A1    3/2003  Starzyk
2015/0278642 A1*  10/2015  Chertok ............... G06K 7/1482
                                                    382/156
(Continued)

FOREIGN PATENT DOCUMENTS

CN         110212528 A  *  9/2019  ............... H02J 3/00
WO    WO-2007059117 A2  *  5/2007  ......... G01N 30/8624
WO     WO 2017/198909 A1    11/2017

OTHER PUBLICATIONS

Buesing et al. Spectral learning of linear dynamics from generalised-linear observations with application to neural population data. In Advances in neural information processing systems. 2012;1682-1690.
(Continued)

*Primary Examiner* — Xuyang Xia
(74) *Attorney, Agent, or Firm* — Emory Patent Group (57) ABSTRACT

Methods and systems are provided to prevent pathological overfitting in training autoencoder networks, by forcing the network to only model structure that is shared between different data variables and to enable an automatic search of hyperparameters in training autoencoder networks, resulting in automated discovery of optimally-trained models. The method may include training a neural network. The training may include applying a first binary mask to the set of training data to determine the training input data. The training may include processing the training input data by the neural network to produce network output data. The training may include determining one or more updates of the parameters based on a comparison of at least a portion of the network output data and a corresponding portion of the
(Continued)

training data. The portion of the network output data and the corresponding portion of the training input data being inverts.

20 Claims, 6 Drawing Sheets

(51) Int. Cl.
  *G06N 3/084*    (2023.01)
  *G06N 3/088*    (2023.01)
  *G06V 10/70*    (2022.01)
  *G06V 10/774*    (2022.01)
  *G06V 10/82*    (2022.01)

(52) U.S. Cl.
  CPC ............ *G06V 10/774* (2022.01); *G06V 10/82* (2022.01); *G06V 10/87* (2022.01)

(56) References Cited

U.S. PATENT DOCUMENTS

| | | | | |
|---|---|---|---|---|
| 2015/0287223 | A1* | 10/2015 | Bresler | G06T 11/006 382/131 |
| 2017/0024642 | A1 | 1/2017 | Xiong et al. | |
| 2017/0351952 | A1* | 12/2017 | Zhang | G06V 10/764 |

OTHER PUBLICATIONS

Churchland et al. Neural population dynamics during reaching. Nature. 2012; 487(7405):51-56.
Duncker et al. Temporal alignment and latent gaussian process factor inference in population spike trains. In Advances in Neural Information Processing Systems. 2018;10445-10455.
Duncker et al. Learning interpretable continuous-time models of latent stochastic dynamical systems. arXiv preprint arXiv:1902.04420. 2019.
Gao et al. Linear dynamical neural population models through nonlinear embeddings. In Advances in neural information processing systems. 2016;163-171.
Gregor et al. Draw: A recurrent neural network for image generation. arXiv preprint arXiv:1502.04623. 2015.
Higgins et al. beta-vae: Learning basic visual concepts with a constrained variational framework. In International Conference on Learning Representations. 2017. vol. 3.
Jaderberg et al. Population based training of neural networks. arXiv preprint arXiv:1711.09846. 2017.
Karl et al. Deep variational bayes filters: Unsupervised learning of state space models from raw data. arXiv preprint arXiv:1605.06432. 2016.
Keshtkaran et al. Enabling hyperparameter optimization in sequential autoencoders for spiking neural data. arXiv preprint arXiv:1908.07896. 2019.
Kingma et al. Auto-encoding variational bayes. arXiv preprint arXiv:1312.6114. 2013.
Krishnan et al. Structured inference networks for nonlinear state space models. Proceedings of the AAAI Conference on Artificial Intelligence. 2017; 31:2101-2109.
Li et al. Feature Learning from Incomplete EEG with Denoising Autoencoder. arXiv preprint arXiv:1410.0818. 2014.
Linderman et al. Bayesian learning and inference in recurrent switching linear dynamical systems. Proceedings of the 20th International Conference on Artificial Intelligence and Statistics. 2017; PMLR 54:914-922.
Macke et al. Empirical models of spiking in neural populations. Advances in Neural Information Processing Systems. 2011; 24:1350-1358. 2011.
Nassar et al. Learning Structured Neural Dynamics From Single Trial Population Recording. 2018 52nd Asilomar Conference on Signals, Systems, and Computers. 2018; 666-670.
Pandarinath et al. Inferring single-trial neural population dynamics using sequential auto-encoders. Nature Methods. 2018; 15: 805-815.
Rezende et al. Stochastic Backpropagation and Approximate Snference In Deep Generative Models. arXiv preprint arXiv:1401.4082. 2014.
Srivastava et al. Dropout: A Simple Way to Prevent Neural Networks from Overfitting. The Journal of Machine Learning Research. 2014; 15:1929-1958.
Sussillo et al. Lfads—Latent Factor Analysis via Dynamical Systems. arXiv preprint arXiv:1608.06315. 2016.
Williams et al. Unsupervised Discovery of Demixed, Low-Dimensional Neural Dynamics across Multiple Timescales through Tensor Component Analysis. Neuron. 2018; 98(6):1099-1115.
Wold, Svante. Cross-Validatory Estimation of the Number of Components in Factor and Principal Components Models. Technometrics. 1978; 20(4):397-405.
Wu et al. Gaussian process based nonlinear latent structure discovery in multivariate spike train data. Advances in Neural Information Processing Systems. 2017; 30:3496-3505.
Yu et al. Gaussian-Process Factor Analysis for Low-Dimensional Single-Trial Analysis of Neural Population Activity. Journal of Neurophysiology. 2009; 102(1):614-635.
Zhang et al. Multi-Person Brain Activity Recognition via Comprehensive EEG Signal Analysis. MobiQuitous 2017: Proceedings of the 14th EAI International Conference on Mobile and Ubiquitous Systems: Computing, Networking and Services. 2017; 28-37.
Zhao et al. Variational Latent Gaussian Process for Recovering Single-Trial Dynamics from Population Spike Trains. Neural Computation. 2016; 29:1293-1316.
Zhao et al. Interpretable nonlinear dynamic modeling of neural trajectories. Advances in neural information processing systems. 2016; 29.
International Search Report and Written Opinion for PCT Application No. PCT/US2019/060090 dated Jun. 11, 2019.
Supplementary European Search Report for EP Application No. 19882395 dated Sep. 23, 2023.
Extended European Search Report for EP Application No. 19882395 dated Oct. 4, 2023.
Response filed on Apr. 30, 2024 in response to Extended European Search Report for EP Application No. 19882395 dated Oct. 4, 2023.

\* cited by examiner

SYSTEMS AND METHODS FOR TRAINING AN AUTOENCODER NEURAL NETWORK USING SPARSE DATA

CROSS-REFERENCE TO RELATED APPLICATIONS

This application is the National Stage of International Application No. PCT/US2019/060090 filed Nov. 6, 2019, which claims the benefit of U.S. Provisional Application No. 62/756,215 filed Nov. 6, 2018 and U.S. Provisional Application No. 62/886,628 filed Aug. 14, 2019. The entirety of each of these applications is hereby incorporated by reference for all purposes.

BACKGROUND

Autoencoder neural networks have emerged as powerful tools to uncover structure and patterns from complex, noisy, high-dimensional data (e.g., speech, acoustic, image, text, neural, etc.). For example, properly trained autoencoders can be used to remove unrelated and noisy information from data. Properly trained autoencoders can be useful in many industry, consumer devices and healthcare applications that involve the processing and transformation of raw information signals into useful or improved outputs which can be interpreted by users or passed on for further analysis.

For example, a properly trained autoencoder should be designed and trained in such a way that it not only reconstructs the data well, but also models the underlying structure in the data. However, the training process can generally include manual setting the model's hyperparameters by trial and error and evaluating how well the network reconstructs the data to ensure optimal performance. These hyperparameters can relate to network architecture (e.g., sizes or number of layers in the networks), regularization constants, and other methods of controlling a model's capacity (i.e., the scope, type, complexity of data transformations that the model is able to learn, etc.). Manual tuning of hyperparameters to ensure optimal performance can be challenging, time-consuming, and critically limiting with regards to the applications.

Additionally, autoencoders can be susceptible to pathological overfitting—i.e., if given enough capacity (that is, for some ranges of parameter or hyperparameter settings), autoencoders will pass the data samples from input to output without the network modeling the underlying structure in the data. This pathological overfitting cannot be detected by standard methods of evaluating the network's performance (i.e., standard validation metrics such as statistical likelihood of the reconstructed data). Pathological overfitting can prevent automatic searching of the model hyperparameters/parameters, due to a lack of appropriate evaluation strategy.

SUMMARY

Thus, there is a need for trained autoencoders, that can be efficiently trained, for example, using sparse data, and that can have better predictive performance.

The systems and methods of the disclosure can prevent pathological overfitting in training autoencoder networks, by forcing the network to only model structure that is shared between different data variables. The systems and methods can thus enable an automatic search of hyperparameters in training autoencoder networks, resulting in automated discovery of optimally-trained models. Relative to models trained by manual tuning of hyperparameters, models trained according to the systems and methods of the disclosure can have improved performance (for example, better de-noising of the data, or enabling better prediction of other variables that are correlated with the data), can be trained in less time, do not require careful manual evaluation and intervention, and can eliminate the need for users to have specialized expertise to train networks.

The systems and methods of the disclosure also address the inefficacy of currently available evaluation metrics. The systems and methods of the disclosure can enable a previously ineffective evaluation metric to be considered a reliable metric, thereby enabling automatic hyperparameter search. Further, by enabling an automatic search of hyperparameters, the systems and methods of the disclosure can provide a more careful hyperparameter adjustment thereby enabling models to be efficiently trained with less data.

In some embodiments, the methods may include a method for training a neural network using a training dataset including training input data and training output data from a set of training data. In some embodiments, the training may include applying a first binary mask to the set of training data to determine the training input data. The training input data may correspond to a subset of the set of training data. The training may include processing the training input data by the neural network according to parameters of the neural network to produce network output data. The training may include determining one or more updates of the parameters based on a comparison of at least a portion of the network output data and a corresponding portion of the training data. The portion of the network output data and the corresponding portion of the training input data may be inverts. The method may include applying the one or more updates to the parameters to increase similarities between the network output data and the training input data.

In some embodiments, the neural network may be an autoencoder neural network. In some embodiments, the training data may be neural data.

In some embodiments, the method may include comparing at least the portion of the network output data and a corresponding portion of the training input data to determine a measure of similarity. The method may further include determining the one or more updates of the parameters using the measure of similarity.

In some embodiments, the method may include applying a second binary mask to the network output data and/or the training input data before determining the measure of similarity and/or before determining the updates of the parameters, the second binary mask being an invert of the first binary mask.

In some embodiments, the measure of similarity may be determined using Poisson likelihood; and the applying the updates may include updating one or more weights of the model using gradients. In some embodiments, the updates may be determined using back propagation.

In some embodiments, the method may further include generating a plurality of different trained neural networks using different sets of training data, different subsets of the training data; different first and/or second binary masks, one or parameters, among others, or a combination thereof. The one or more parameters may include one or more hyperparameters.

In some embodiments, the method may further include evaluating a performance of each trained neural network. The method may also include selecting one of the plurality of different trained neural network based on measure using the performances. In some embodiments, the performance may be determined using Poisson likelihood.

In some embodiments, the system may include a system for training a neural network. In some embodiments, the system may include one or more processors; and one or more hardware storage devices having stored thereon computer-executable instructions. The instructions may be executable by the one or more processors to cause the computing system to perform at least the training a neural network using a training dataset including training input data and training output data from a set of training data. In some embodiments, the training may include applying a first binary mask to the set of training data to determine the training input data. The training input data corresponding to a subset of the set of training data. The training may also include processing the training input data by the neural network according to parameters of the neural network to produce network output data. The training may further include determining one or more updates of the parameters based on a comparison of at least a portion of the network output data and a corresponding portion of the training data. The portion of the network output data and the corresponding portion of the training input data may be inverts. The training may include applying the one or more updates to the parameters to increase similarities between the network output data and the training input data.

Additional advantages of the disclosure will be set forth in part in the description which follows, and in part will be obvious from the description, or may be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The disclosure can be better understood with the reference to the following drawings and description. The components in the figures are not necessarily to scale, the emphasis being placed upon illustrating the principles of the disclosure.

DESCRIPTION OF THE EMBODIMENTS

In the following description, numerous specific details are set forth such as examples of specific components, devices, methods, etc., in order to provide a thorough understanding of embodiments of the disclosure. It will be apparent, however, to one skilled in the art that these specific details need not be employed to practice embodiments of the disclosure. In other instances, well-known materials or methods have not been described in detail in order to avoid unnecessarily obscuring embodiments of the disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

The disclosure relates to systems and methods that use a regulation technique referred to as "coordinated dropout," (later referred to as "CD"). The regulation technique according to the disclosure can prevent pathological overfitting in training autoencoder networks, by forcing the network to only model structure that is shared between different data variables. At each training step, the systems and methods randomly drop samples from the network input (encoder input), for example, by using a mask, and force the output (decoder output) to only reconstruct those samples, which are dropped from the input, for example, by using an invert of the mask. This process forces the network to model the shared structure between the data samples as it tries to reconstruct the samples at the output from all other complementary data sample at the input. The systems and methods of the disclosure can thereby prevent pathological overfitting and provide a reliable evaluation metric. As a result, the systems and methods of the disclosure can enable the automatic search of hyperparameters in training autoencoder networks, which in turn lead to more optimal trained models in less time and using less resources.

Additionally, the methods and systems of the disclosure can also efficiently and effectively train autoencoder models using less or sparse data. For example, some classes of large data, tend to be extremely sparse, i.e., they can have a large fraction of missing, "null" or "zero," and/or otherwise identical elements. By way of example, large data, such as neural spiking data, typically have "null" or "zero" or otherwise identical elements.

Typically, training autoencoder networks using neural data can be time and data intensive. However, because the systems and methods according to the disclosure force the network to only model structure that is shared between different data variables and utilize hyperparameter optimization, the methods and systems of the disclosure can generate a properly trained autoencoder network using less data and, in less time, than conventional autoencoder models. The trained autoencoder network according to the disclosure may also have a better predictive performance.

While some examples of the disclosure may be specific to neural data, it will be understood that these examples are nonlimiting and that the methods and systems may be used to train autoencoder network models for other types of data, including but not limited to speech data, image data, video data, text data, radar, lidar, or other sensor data, other data with a temporal structure, among others, or a combination thereof. The trained autoencoder network models of the disclosure may also be used in any autonomous system and is not limited to, for example, brain machine interfaces configured to communicate or control external devices using brain signals, including but not limited to controlling movement of prosthetic limb(s), moving a cursor on a computer screen, driving a wheelchair or other assistive device, control movement of a paralyzed limb, among others, or a combination thereof. For example, an autonomous system may include but is not limited to vehicles, missiles, industrial robots, other systems requiring dynamic control, among others, or any combination thereof.

In this description and in the claims, the term "computing system" or "computer architecture" is defined broadly as including any standalone or distributed device(s) and/or system(s) that include at least one physical and tangible processor, and a physical and tangible memory capable of having thereon computer-executable instructions that may be executed by the processor(s).

Figure 1:
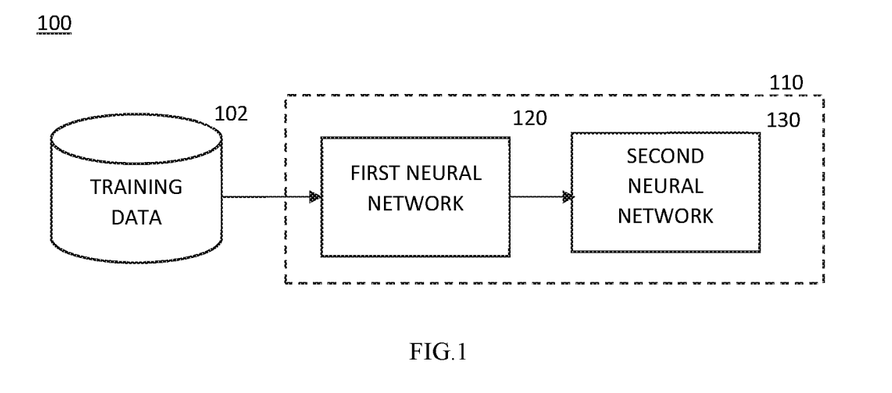
FIG. 1 is a diagram that illustrates an example of a block diagram of a neural network system according to embodiments.

FIG. 1 is a diagram that illustrates an example of a block diagram of a neural network system 100 according to embodiments. The system 100 may include a neural network system 110 that uses the output of a first neural network 120 as input to a second neural network 130. The neural network system 110 may be implemented by a program, custom circuitry, or by a combination of custom circuitry and a program. For example, the neural network system 110 may be implemented using a GPU (graphics processing unit), CPU (central processing unit), or any processor capable of performing the operations described herein. Furthermore, persons of ordinary skill in the art will understand that any system that performs the operations of the neural network system 100 is within the scope and spirit of embodiments of the disclosure.

The first neural network 120 may be configured as an autoencoder (also referred to as autoencoder network), such as a sequential autoencoder, trained using training data 102. For example, the training data 102 may be data collected for one or more users. For example, for a brain machine interface, the training data may be neural (spiking) data from a user collected using a detecting system, for example, microelectrode arrays. The second neural network 130 may be configured to be a neural network that decodes the movement intention (e.g., arm velocity), and may be trained using the denoised data generated by the first neural network 120.

Figure 2:
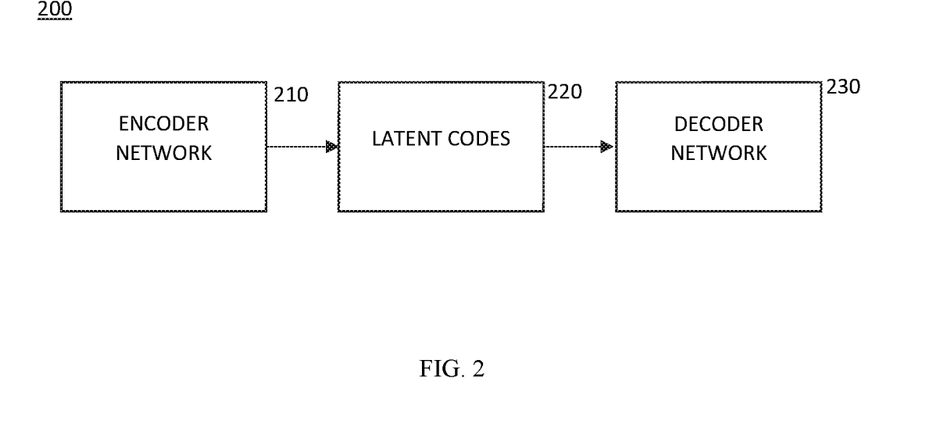
FIG. 2 shows an example of an autoencoder network according to embodiments.

FIG. 2 shows an example 200 of the autoencoder network (e.g., first neural network 120) according to embodiments. In this example, the autoencoder network 200 may include an encoder network 210, latent codes 220, and a decoder network 230. In this example, the encoder network 210 may generate a latent representation of the data 220, and the decoder network 230 may receive the latent codes and regenerate (an approximation of) the data by estimating, for example, the underlying rate of activity of neural spikes.

In some embodiment, the training data may be divided into plurality of sets (also referred to as "windows") of training data before being inputted into the encoder 210 to train the autoencoder network. In some embodiments, the training of the autoencoder network may be performed in parallel using the sets of the data. Before each training iteration, a first binary mask may be applied to the set of the training data so that samples may be randomly dropped from the set of training data inputted into the encoder (e.g., encoder input) 210 and a second binary mask may be applied to the output (decoder output) of the decoder 230 so that only those samples that have be dropped from the encoder input may be reconstructed. The second binary mask may be an invert of the first binary mask. This process can force the network 200 to model the shared structure between the data samples as it tries to reconstruct the samples at the output from all other complementary data sample at the input.

Figure 3:
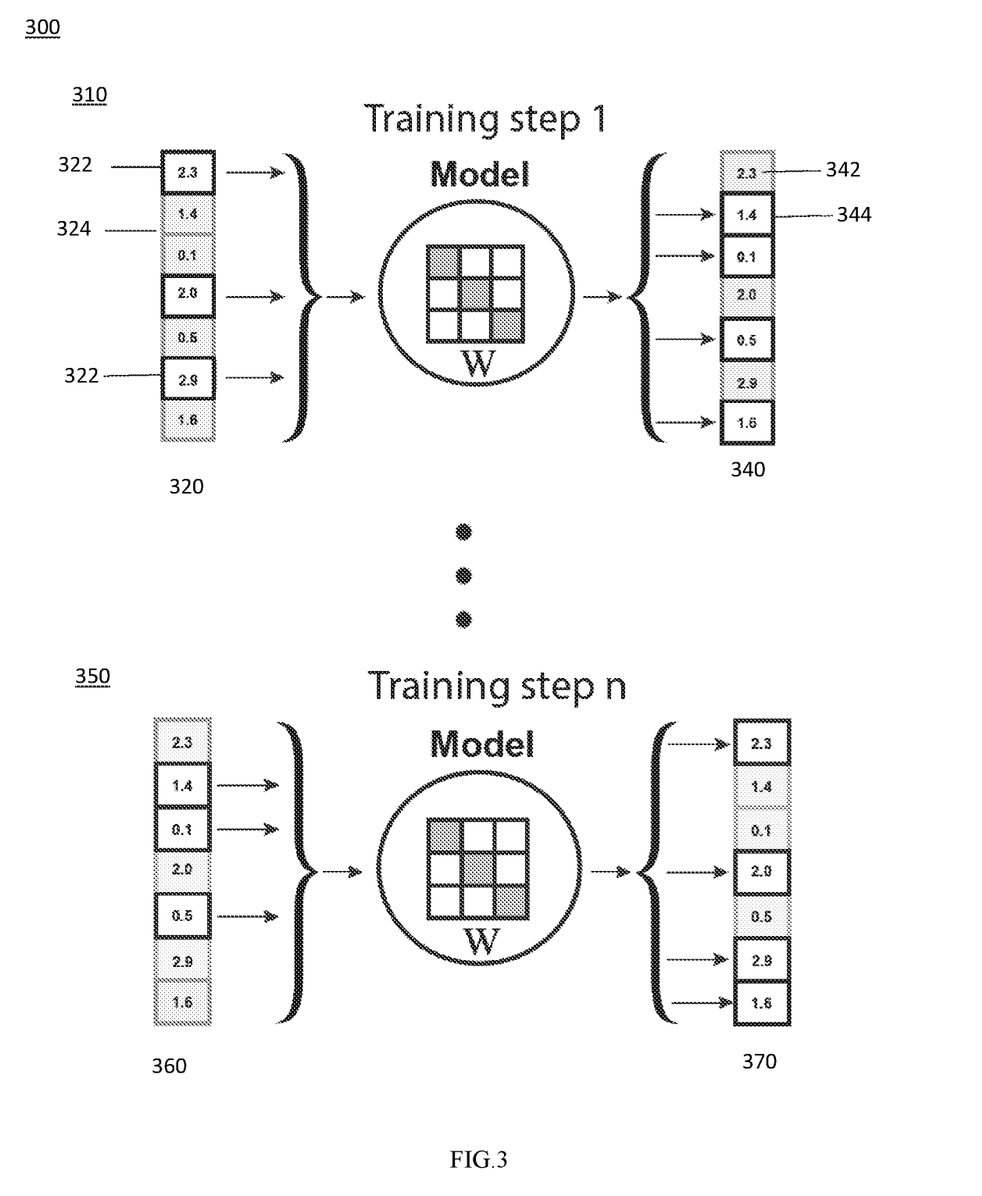
FIG. 3 is an illustrative example of the training the autoencoder according to embodiments.

FIG. 3 shows an illustrative example 300 of the training the autoencoder 200 according to embodiments. In this example, each set of training data to be inputted to the autoencoder can be a matrix of N×T (N is the number of neurons, T is the number of timepoints in the chunk) where the value in each element of that matrix is the count of spikes for a specific datapoint and neuron. Before being inputted, a first binary mask (same size N×T) where the elements of this mask are either 0 or 1 and these 0s and 1s may be applied to each set of the training data. The first binary mask may be randomly generated, selected from a plurality of stored masks, among others, or a combination thereof. The network 200 can only pass the elements of the input matrix that correspond to the elements that are is in the mask matrix (the rest of the elements are passed as zeros).

As shown in FIG. 3, for the first training step (310), the input 320 of the model can correspond to a subset of the training data determined after applying the first binary mask. The training data identified by bold-bordered (non-shaded) rectangles (e.g., 322) corresponds to the subset of training data (e.g., first subset) to be inputted into the encoder network 210. The training data identified by the greyed rectangles (e.g., 324) corresponds to data prevented from being inputted to the model by the first binary mask.

After the data is processed by the autoencoder 200, the autoencoder 200 can output the subset of training data as a matrix with the same shape as the input (N×T). At the output, the autoencoder 200 can apply a second binary mask, which is an invert of the first binary mask, so that the autoencoder only reconstructs the data for the elements which correspond to 0s in the second mask (hence the complementary data points passed to input).

Figure 4:
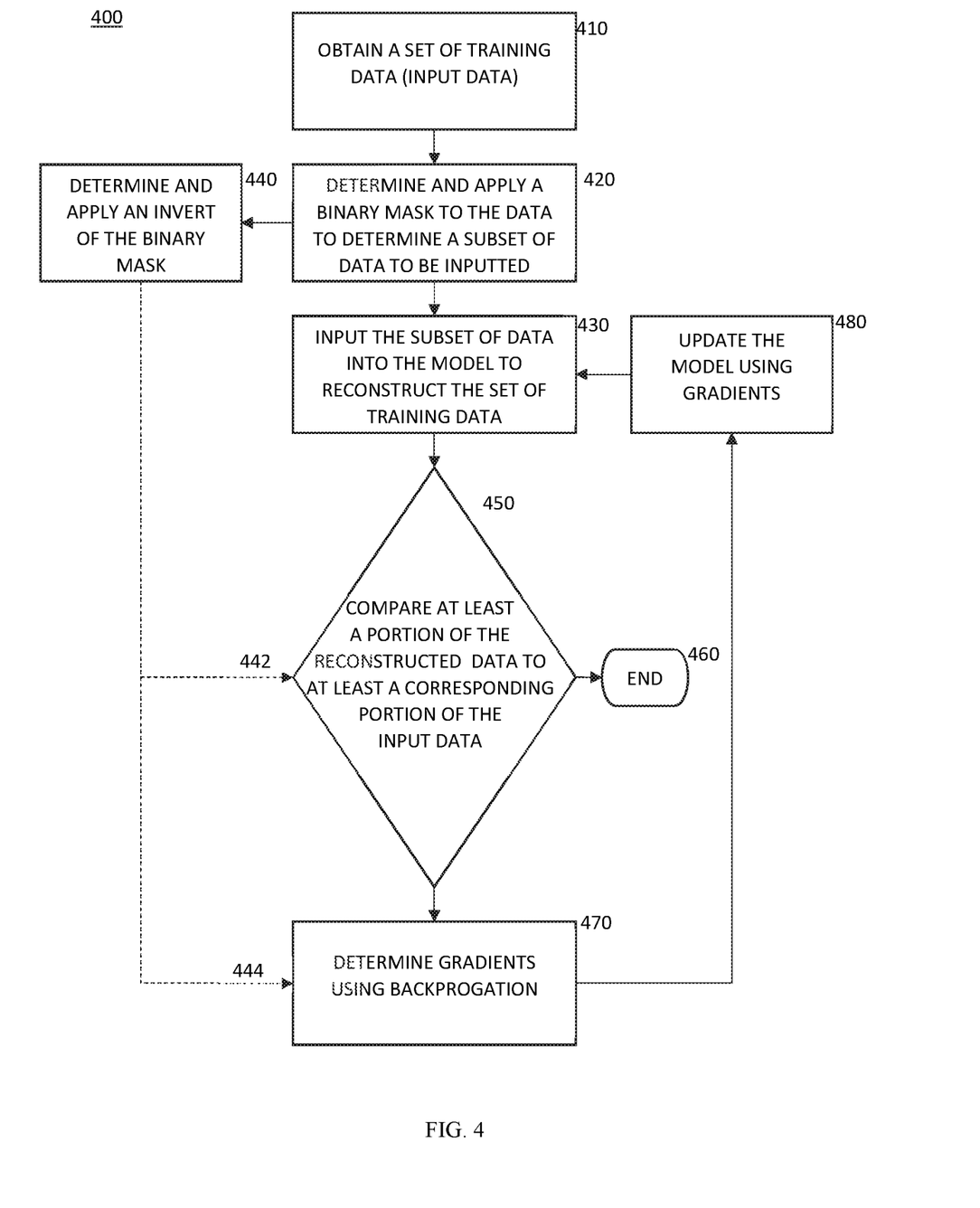
FIG. 4 shows an exemplary method of training an autoencoder network according to embodiments.
Figure 5:
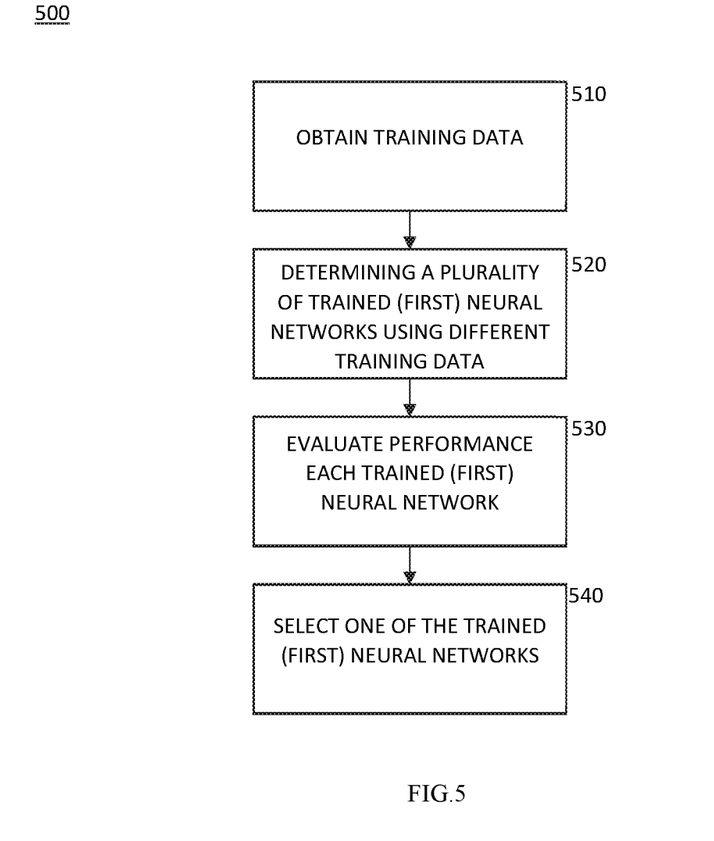
FIG. 5 shows an example of a method of automatically searching hyperparameters according to embodiments.
Figure 6:
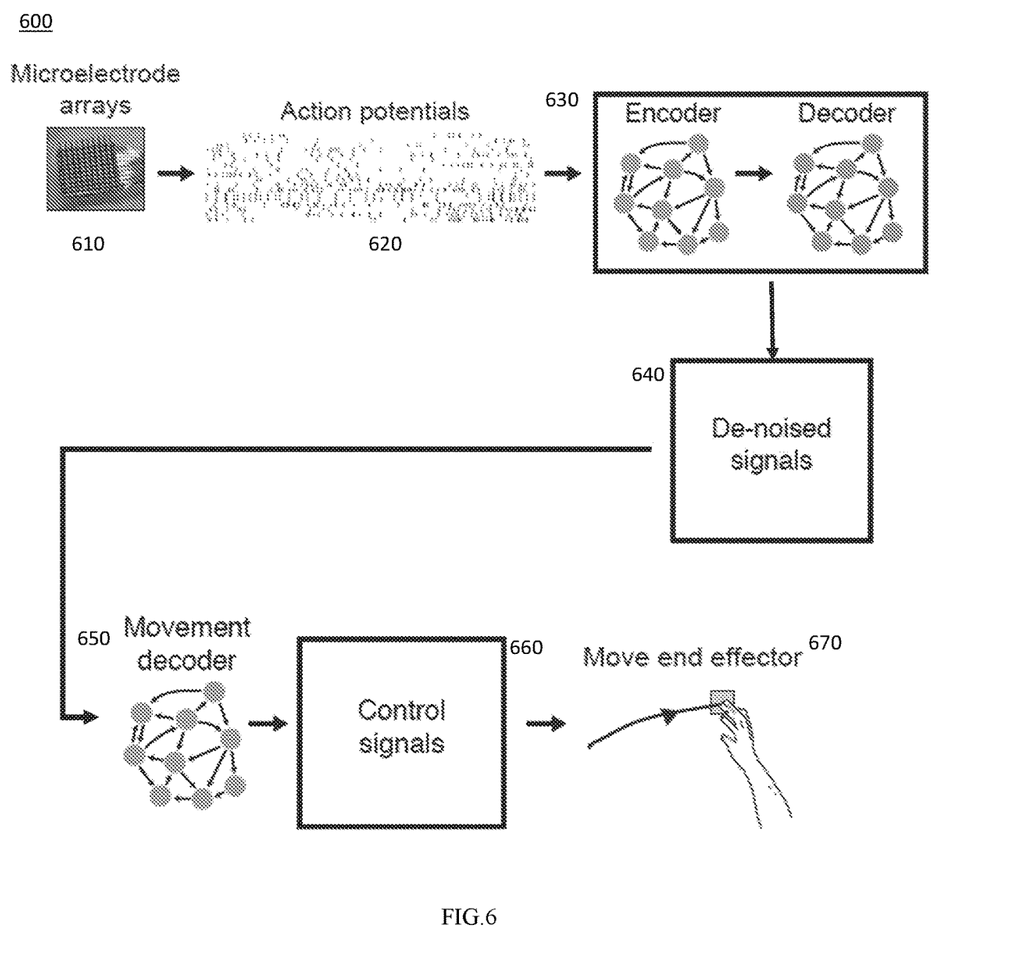
FIG. 6 shows an example of an implementation of the methods according to embodiments in a brain-machine interface.

As shown in FIG. 3, the output 340 of the decoder 230 used for training the model can correspond to a subset of the output data determined based on the second binary mask, for example, as described with respect to FIGS. 4-6. The subset of the output data identified by bold-bordered (non-shaded) rectangles (e.g., 344) correspond to data whose reconstruction quality can be used to update the model. As shown, the data subset used as the input 320 to the model can correspond to the data subset (e.g., 342) whose reconstruction may not be used to update the model, while the data subset (e.g., 324) not included in the input 320 to the model correspond to data (344) whose reconstruction quality will be used to update the model (parameters, e.g., weights (W) via gradient descent).

The training step 310 may be repeated for that set until the system 200 determines that the model has achieved optimal performance for that set of training data/all sets of training data. For example, in subsequent training steps (e.g., 350), a different (first) binary mask may be applied to the input 360 resulting in a different set of data (370) whose reconstruction quality can be used to update the model.

Additionally, training steps 310-350 may be repeated in parallel for a plurality of sets of data.

FIG. 4 shows an exemplary method 400 of training an autoencoder network 200 according to embodiments.

In some embodiments, the method 400 may include a step 410 of obtaining a set of training data (also referred to as "original training data" or "original set of training data" or "input set of training data"). The training data may include neural data, such as spiking neural data, obtained from a detection device (e.g., implanted microelectrode arrays). In this example, the neural data may be provided in a matrix form and may represent spiking neural data. This training data may include data from one or more windows of time (i.e., each time window may include spiking data from a number of neurons or channels over some time period). By way of example, depending on the temporal resolution required, the spiking neural data may be binary, the spiking neural data may be binned so that each matrix element represents the spiking activity over a longer time period, the spiking neural data may be represented by discrete counts, the spiking neural data may be represented by continuous variables, among others, or a combination thereof. Multiple windows of data may be processed simultaneously.

Next, the method 400 may include a step 420 of determining a (first) mask to be applied to the set of training data to generate a (first) subset of training data. For example, the (first) mask may be a binary mask. In some embodiments, the step 420 may include generating the (first) mask, obtaining the (first) binary mask from a plurality of (previously generated) (first) binary masks stored, among others, or any combination thereof. The first binary mask may be generated by randomly choosing binary variables according to a weighted probability of choosing a one or zero. The step 420 may include applying the first mask to the set of training data ("original data" or "input data") to determine a (first) subset of the training data. For example, the binary mask may be applied so that all places where the binary mask has values of one represent the subset of the original training data that are inputted to the model ("subset of training data"), and the remaining training data (i.e., the training data of the set other than the subset of the training data) are set to zero.

Next, the method 400 may include a step 430 of inputting the subset of the (original) set of training data (the data after the mask is applied) into the model. In some embodiments, the model may be a denoising type of network, such as an autoencoder neural network. In some examples, the autoencoder neural network may be a sequential autoencoder network. In some examples, the autoencoder neural network may be a variational autoencoder neural network. In some examples, the autoencoder neural network may be a variational sequential autoencoder neural network.

For example, the step 430 may include inputting the (first) subset of the set of training data to a neural network (autoencoder neural network 200) for generating a reconstruction of the set of the training data (i.e., input data). The reconstruction may be approximation of the original set of training data (step 410).

Next, the method 400 may include a step of 440 of determining a second mask. The second mask may correspond to an invert of the first mask. Like the first mask, the second mask may also be a binary mask in some embodiments. The step 440 may include applying the second mask in steps 450 and/or 470 (as depicted by arrows 442 and 444, respectively). It will also be understood that steps 450 and/or 470 may include the step 440 of determining the second mask.

The method 400 may include a step of 450 of comparing at least a portion of the reconstructed set of training data to the corresponding portion(s) of the set of training data to determine similarity between that reconstructed set of training data and that (original) set of training data. This comparison may be quantified, for example, using a likelihood function. By way of example, the similarity may correspond to a measure of similarity determined using the likelihood function and may include not is not limited to Poisson likelihood. The function may include but is not limited to Poisson likelihood/distribution function, the Bernoulli likelihood/distribution function, or generalized count likelihood/distribution functions.

In some embodiments, the step 450 may include comparing the (entire) original set of training data and the (entire) reconstructed set of training data to determine the similarity between the (entire) reconstructed training data and the (entire) (original) training data.

In other embodiments, the step 450 may include comparing a portion of the (original) set of training data and the corresponding portion of the reconstructed training data remaining after the second mask is applied to the set of training data and reconstructed training data. For example, as shown in FIG. 3, the subset of data 320 may be compared to the subset of data 340. In this example, the second mask may be applied to the set of training (original) data and the reconstructed input data to determine a second subset of the training data and the second subset of the reconstructed data before the step 450. This way, the autoencoder network can be only evaluated in step 450 with respect to the datapoints that the network has not seen at the input.

In some embodiments, the step 450 may include determining whether additional updates are necessary based on this comparison. For example, if after a number of training iterations, there is no improvement (e.g., no significant change in similarity, thresholding, etc.), then the step 450 may determine to end the training (step 460). When training is ended, the model (FIG. 3) may be considered ready to be used, for example, in the training the decoder 130, for example, for generating control signals for a brain machine interface.

Next, if the step 450 determines that additional updates to the model are necessary based on the comparison, the method 400 may include a step 470. The step 470 may include determining one or more gradients through back-propagation using the (quantified) measure of similarity (step 450).

In some embodiments, if the entire set of training data is reconstructed and compared in step 450, the step 470 may include the step 444 of applying the second binary mask to block the datapoints that have been used in calculating the measure of similarity (e.g., Poisson likelihood) and that correspond to the subset of training data inputted so that the gradients are not determined for those datapoints. For example, referring to FIG. 3, the binary mask may be applied to so that the datapoints 342 are omitted or blocked from the back propagation procedure and the datapoints 344 are used in the backpropagation procedure. This way, only the datapoints 344 are used in the gradient determination; and datapoints 342, which correspond to datapoints 322, can be blocked from the backpropagation procedure and have no effect on the gradient computation.

In some embodiments, the step 470 may include determining one or more updates to one or more of the parameters of the model (e.g., one or more updates to the model weights using the gradients) using all datapoints used in calculating the measure of similarity (e.g., Poisson likelihood) determined in step 442. For example, with reference to FIG. 3, the effect on the gradient calculation using the reconstructed data 342, corresponding to the input datapoints 322, have been previously blocked by the application of the secondary binary mask in step 442.

Next, the method 400 may include a step 480 of updating one or more parameters of the model using the one or more updates (e.g., gradients) determined in the step 470. The one or more parameters may include but is/are not limited to one or more hyperparameters, other parameters, among others, or a combination thereof. For example, the weights of the model may be updated (e.g., via gradient descent). After the model is updated (i.e., parameters are updated based on the gradients), the method 400 (e.g., beginning at step 410) may be repeated using the same and/or different sets of training data until the determines that the model training has ended (at step 460), (i.e., the model has achieved optimal performance for that set of training data/all sets of training data). Additionally, training steps 310-350 may be repeated in parallel for a plurality of sets of data.

The method 400 may also be performed in parallel on different sets of training data, subsets of the set of training data, among others, or any combination thereof.

In some embodiments, the system 100 may generate a plurality of different trained autoencoder network (models 200), for example, by training each model using the training data and the method 400. The different trained models may be generated using different model parameters, different model hyperparameters, or a combination thereof. In some embodiments, the system 100 may automatically search the hyperparameters to determine an optimal autoencoder model (network 200) for the training data.

FIG. 5 shows an example of a method 500 of automatically searching hyperparameters, according to embodiments. In some embodiments, the method 500 may include a step 510 of obtaining training data. Next the method 500 may include a step of determining a plurality of trained autoencoders (first neural networks) using different sets of training data and/or different parameters, different hyperparameters, or a combination thereof, for example, using the method 400. Next, the method 500 may include a step 530 of evaluating a performance of each trained autoencoder network. In some embodiments, the evaluation may be based on validation loss corresponding to the calculated Poisson likelihood determined in step 470. This evaluation may be made by measuring the similarity of the reconstructed data and (original) training data or a subset thereof, based on a likelihood metric, for example, determined in step 470. Based on the determined performance (e.g., calculated validation loss), the method 500 may include a step 540 of selecting one of the trained autoencoder networks. For example, the model that has the lowest validation loss may be selected as the optimal model.

The methods and systems of the disclosure can improve the performance of autoencoders, specifically, sequential autoencoders (SAE), thereby improving the performance of "neuromodulation" devices such as deep brain stimulators (commonly used to treat conditions such as Parkinson's disease, dystonia, essential tremor) and responsive neurostimulators (which recently gained FDA approval to treat epilepsy). SAEs could also dramatically improve the performance of brain-machine interfaces, which aim to restore function for people who are paralyzed (spinal cord injury, ALS, stroke).

FIG. 6 shows an example 600 of an implementation of the methods according to the disclosure in a brain-machine interface. In this example, the implementation 600 may include acquiring electrophysiological signals from the brain of a user using an implantable device 610, such as one or more microelectrode arrays. These signals may include neuronal action potentials 620 and may be discrete counts of action potentials within some specified window size. These data may be inputted to an autoencoding neural network 630 (e.g., an autoencoder network trained using method 400). The output of this network may be a de-noised representation of the input data 640, for example, inferred firing rates that are consistent with the observed action potentials. The de-noised representation may then be fed into a movement decoder 650, which may translate the de-noised neural activity into intended movements 660. These intended movements may act as control signals for an end effector to accomplish the intended movement 670, such as a prosthetic arm, patterns of electrical stimulation that cause a paralyzed limb to move, among others, or a combination thereof.

Figure 7:
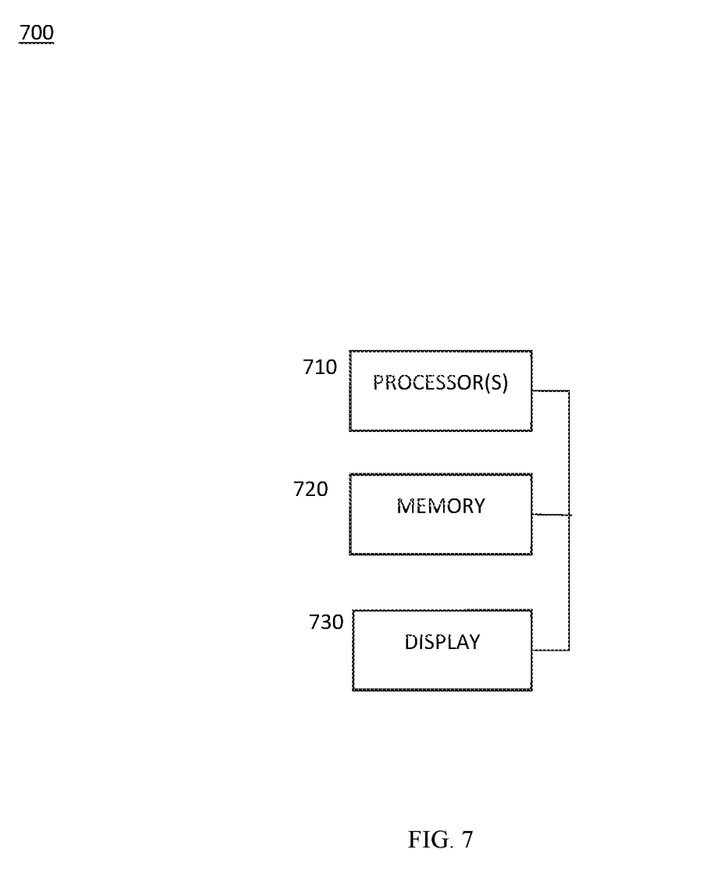
FIG. 7 shows a block diagram illustrating an example of a computing system according to embodiments.

One or more of the devices and/or systems of the system 100 and/or 200 may be and/or include a computer system and/or device. FIG. 7 is a block diagram showing an example of a computer system 700. The modules of the computer system 700 may be included in at least some of the systems and/or modules, as well as other devices and/or systems of the systems 100 and/or 200.

The system for carrying out the embodiments of the methods disclosed herein is not limited to the system shown in FIG. 7. Other systems may also be used. It is also to be understood that the system 700 may omit any of the modules illustrated and/or may include additional modules not shown.

The system 700 shown in FIG. 7 may include any number of modules that communicate with each other through electrical or data connections (not shown). In some embodiments, the modules may be connected via any network (e.g., wired network, wireless network, or any combination thereof).

By way of example, the system 700 be a computing system, such as a workstation, computer, a server, or the like, a personal computer, such as a desktop or laptop, a workstation, or combinations thereof.

In some embodiments, the system 700 may include one or more processors 710. The processor(s) 710 may include one or more processing units, which may be any known processor or a microprocessor. For example, the processor(s) may include any known central processing unit (CPU), imaging processing unit, graphical processing unit (GPU) (e.g., capable of efficient arithmetic on large matrices encountered in deep learning models), among others, or any combination thereof. The processor(s) 710 may be coupled directly or indirectly to one or more computer-readable storage media (e.g., memory) 720. The memory 720 may include random access memory (RAM), read-only memory (ROM), disk drive, tape drive, etc., or any combinations thereof. The memory 720 may be configured to store programs and data, including data structures. In some embodiments, the memory 720 may also include a frame buffer for storing data arrays.

In some embodiments, another system may assume the training of the model, or other functions of the processor(s) 710. In response to commands received from an input device, the programs or data stored in the memory 720 may be archived in long term storage or may be further processed by the processor and presented on the display 730.

In some embodiments, the disclosed methods (e.g., FIGS. 3-5) may be implemented using software applications that are stored in a memory and executed by the one or more processors (e.g., CPU and/or GPU). In some embodiments, the disclosed methods may be implemented using software applications that are stored in memories and executed by one or more processors distributed across one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 720, and/or in one or more separate computer system components (e.g., in a distributed computer system environment). The computer-executable instructions may be used to implement and/or instantiate all of the functionality disclosed herein, including the functionality that is disclosed in reference to the diagrams of FIGS. 3-5.

As such, any of the modules of the system 700 may be a general-purpose computer system, that becomes a specific purpose computer system when executing the routines and methods of the disclosure. The systems and/or modules of the system 700 may also include an operating system and micro instruction code. The various processes and functions described herein may either be part of the micro instruction code or part of the application program or routine (or any combination thereof) that is executed via the operating system.

If written in a programming language conforming to a recognized standard, sequences of instructions designed to implement the methods may be compiled for execution on a variety of hardware systems and for interface to a variety of operating systems. In addition, embodiments are not described with reference to any particular programming language. It will be appreciated that a variety of programming languages may be used to implement embodiments of the disclosure. An example of hardware for performing the described functions is shown in FIG. 7. It is to be further understood that, because some of the constituent system components and method steps depicted in the accompanying figures can be implemented in software, the actual connections between the systems components (or the process steps) may differ depending upon the manner in which the disclosure is programmed. Given the teachings of the disclosure provided herein, one of ordinary skill in the related art will be able to contemplate these and similar implementations or configurations of the disclosure.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other embodiments, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes but is not limited to portable or fixed storage devices, optical storage devices, wireless channels, and/or various other storage mediums capable of storing that contain or carry instruction(s) and/or data.

The disclosures of each and every publication cited herein are hereby incorporated herein by reference in their entirety.

While the disclosure has been described in detail with reference to exemplary embodiments, those skilled in the art will appreciate that various modifications and substitutions may be made thereto without departing from the spirit and scope of the disclosure as set forth in the appended claims. For example, elements and/or features of different exemplary embodiments may be combined with each other and/or substituted for each other within the scope of this disclosure and appended claims.

What is claimed is:

1. A method for of training an autoencoder neural network, comprising:
   training the autoencoder network of a brain-machine interface to generate a de-noised representation of electrophysical data acquired from a brain of a user to control an external device, the training including:
   applying a first binary mask to a set of electrophysical training data of the user recorded by a detection system to generate the training input data, the training input data corresponding to a subset of the set of electrophysical training data;
   processing the training input data by the autoencoder neural network according to parameters of the autoencoder neural network to produce network output data, the network output data being a reconstruction of the training input data;

determining one or more updates of the parameters of the autoencoder neural network based on a comparison of at least a portion of the network output data and a corresponding portion of the training input data to determine a similarity between the at least the portion of the network output data and the corresponding portion of the training input data, the portion of the network output data and the corresponding portion of the training input data being inverts; and applying the one or more updates to the parameters of the autoencoder neural network to increase similarities between the network output data and the training input data.

2. The method according to claim 1, wherein:
the autoencoder neural network is a sequential autoencoder neural network;
the autoencoder neural network includes an encoder and a decoder; and
the network output data is a reconstruction of the set of training data.

3. The method according to claim 2, wherein the electrophysical data is spiking neural data and the detection system is microelectrode arrays, the method further comprising:
generating a trained autoencoder network including the one or more updates for the brain-machine interface;
wherein the brain-machine interface includes the trained autoencoder network and a movement decoder; and
wherein the de-noised representation of the spiking neural data generated by the trained autoencoder network is translated by the movement decoder into the control signals for the external device.

4. The method according to claim 1, further comprising:
comparing at least the portion of the network output data and a corresponding portion of the training input data to determine a measure of similarity; and
determining the one or more updates of the parameters using the measure of similarity.

5. The method according to claim 4, further comprising:
applying a second binary mask to the network output data and/or the training input data to determine the portion of the network data and/or the corresponding portion of the training input data, the second binary mask being an invert of the first binary mask.

6. The method according to claim 4, wherein:
the measure of similarity is determined using Poisson likelihood; and
the applying the one or more updates including updating one or more weights of the neural network using gradients.

7. The method according to claim 6, wherein the one or more updates are determined using back propagation.

8. The method according to claim 5, further comprising:
generating a plurality of different trained neural networks using different sets of training data, different subsets of the training data, different first and/or second binary masks, one or parameters, or a combination thereof; and
the one or more parameters including one or more hyperparameters.

9. The method according to claim 8, further comprising:
evaluating a performance of each trained neural network; and selecting one of the plurality of different trained neural network based on a measure using the performance of each trained neural network.

10. The method according to claim 9, wherein the performance is determined using Poisson likelihood.

11. A system of training an autoencoder neural network, comprising:
one or more processors; and
one or more hardware storage devices having stored thereon computer-executable instructions which are executable by the one or more processors to cause the computing system to perform at least the following:
training the autoencoder network of a brain-machine interface to generate a de-noised representation of electrophysical data acquired from a brain of a user to control an external device, the training including:
applying a first binary mask to a set of electrophysical training data of the user recorded by a detection system to generate the training input data, the training input data corresponding to a subset of the set of electrophysical training data;
processing the training input data by the autoencoder neural network according to parameters of the autoencoder neural network to produce network output data, the network output data being a reconstruction of the training input data;
determining one or more updates of the parameters of the autoencoder neural network based on a comparison of at least a portion of the network output data and a corresponding portion of the training input data to determine a similarity between the at least the portion of the network output data and the corresponding portion of the training input data, the portion of the network output data and the corresponding portion of the training input data being inverts; and
applying the one or more updates to the parameters of the autoencoder neural network to increase similarities between the network output data and the training input data.

12. The system according to claim 11, wherein:
the autoencoder neural network is a sequential autoencoder neural network;
the autoencoder neural network includes an encoder and a decoder; and
the network output data is a reconstruction of the set of training data.

13. The system according to claim 12, wherein the electrophysical data is spiking neural data and the detection system is microelectrode arrays, the system further comprises:
a brain-machine interface, the brain-machine interface including a trained autoencoder network and a movement decoder;
wherein the one or more processors are further configured to cause the computing system to perform at least the following:
generating the trained autoencoder network including the one or more updates for the brain-machine interface;
wherein the de-noised representation of the spiking neural data generated by the trained autoencoder network is translated by the movement decoder into the control signals for the external device.

14. The system according to claim 11, wherein the one or more processors are further configured to cause the computing system to perform at least the following:

comparing at least the portion of the network output data and a corresponding portion of the training input data to determine a measure of similarity; and determining the one or more updates of the parameters using the measure of similarity.

15. The system according to claim 14, wherein the one or more processors are further configured to cause the computing system to perform at least the following:

applying a second binary mask to the network output data and/or the training input data to determine the portion of the network data and/or the corresponding portion of the training input data, the second binary mask being an invert of the first binary mask.

16. The system according to claim 14, wherein:

the measure of similarity is determined using Poisson likelihood; and the applying the one or more updates including updating one or more weights of the neural network using gradients.

17. The system according to claim 16, wherein the one or more updates are determined using back propagation.

18. The system according to claim 15, wherein the one or more processors are further configured to cause the computing system to perform at least the following:

generating a plurality of different trained neural networks using different sets of training data, different subsets of the training data, different first and/or second binary masks, one or parameters, or a combination thereof; and the one or more parameters including one or more hyperparameters.

19. The system according to claim 18, wherein the one or more processors are further configured to cause the computing system to perform at least the following:

evaluating a performance of each trained neural network; and selecting one of the plurality of different trained neural network based on measure using the performance of each trained neural network.

20. The system according to claim 19, wherein the performance is determined using Poisson likelihood.

* * * * *